(12) United States Patent
Chang

(10) Patent No.: US 7,242,810 B2
(45) Date of Patent: Jul. 10, 2007

(54) MULTIMODAL HIGH-DIMENSIONAL DATA FUSION FOR CLASSIFICATION AND IDENTIFICATION

(75) Inventor: Edward Y. Chang, Santa Barbara, CA (US)

(73) Assignee: Proximex Corporation, Sunnyvale, CA (US)

( * ) Notice: Subject to any disclaimer, the term of this patent is extended or adjusted under 35 U.S.C. 154(b) by 0 days.

(21) Appl. No.: 11/129,090

(22) Filed: May 13, 2005

(65) Prior Publication Data

US 2005/0265607 A1 Dec. 1, 2005

Related U.S. Application Data

(60) Provisional application No. 60/571,036, filed on May 13, 2004.

(51) Int. Cl.
*G06K 9/68* (2006.01)
*G06K 9/62* (2006.01)

(52) U.S. Cl. .................. 382/227; 382/159; 382/225

(58) Field of Classification Search ............ None
See application file for complete search history.

(56) References Cited

U.S. PATENT DOCUMENTS

| | | | |
|---|---|---|---|
| 6,944,319 B1 * | 9/2005 | Huang et al. | 382/118 |
| 2003/0169908 A1 * | 9/2003 | Kim et al. | 382/118 |
| 2004/0022442 A1 * | 2/2004 | Kim | 382/225 |
| 2004/0136574 A1 * | 7/2004 | Kozakaya et al. | 382/118 |
| 2005/0100209 A1 * | 5/2005 | Lewis et al. | 382/159 |
| 2005/0265607 A1 | 12/2005 | Chang | |

OTHER PUBLICATIONS

"Combining multiple classifiers by averaging or by multiplying?" by Tax et al. ("Tax") Pattern Recognition, 33(9):1475-1485, 2000.*
Smaragdis et al., "Audio/Visual Independent Components", 4th International Symposium on Independent Component Analysis and Blind Signal Separation (ICA2003), Apr. 2003, pp. 709-714, Nara, Japan.
Flickner et al., "Query by Image and Video Content: the QBIC System", 11th Annual Computer Security Applications Conference, Sep. 1995, pp. 23-32.
Tax et al., "Combining Multiple Classifiers by Averaging or Multiplying?", Pattern Recognition, The Journal of Pattern Recognition Society, Jun. 1999, pp. 1475-1485, 33 (2000), Elsevier Science Ltd.
Fagin et al., "Optimal Aggregation Algorithms for Middleware", Journal of Computer and System Sciences, Apr. 2002, pp. 614-656, 66 (2003), Elsevier Science Ltd.

(Continued)

*Primary Examiner*—Ishrat Sherali
*Assistant Examiner*—Charles Kim
(74) *Attorney, Agent, or Firm*—Stephen C. Durant; Novak Druce & Quigg LLP

(57) ABSTRACT

A method is provided for evaluating identity of an object, the method including: converting feature information representing the object to a plurality of mathematically defined components; grouping the components into multiple modalities; producing respective first prediction information for each respective modality wherein the respective prediction information for each respective modality is based upon respective components grouped into that respective modality; and producing second prediction information based upon the respective first prediction information produced for the multiple respective modalities.

38 Claims, 6 Drawing Sheets

OTHER PUBLICATIONS

Rui et al., "Image Retrieval: Past, Present, and Future" International Symposium on Multimedia Information Processing, 1997.

Hershey et al., "Audio-Vision: Using Audio-Visual Synchrony to Locate Sounds", Advances in Neural Information Processing Systems 12, MIT Press, Cambridge MA, 2001.

Hansen et al., "On Independent Component Analysis for Multimedia Signals", Multimedia Image and Video Processing, CRC Press, 2000.

Ding et al., "A Min-max Cut Algorithm for Graph Partitioning and Data Clustering", IEEE International Conference on Data Mining, pp. 107-114, 2001.

Vinokourov et al.; "Intferring a Semantic Representation of Text Via Cross-Language Correlation Analysis", In Advances of Neural Information Processing, 2002.

Westerveld, "Image Retrieval: Content Versus Context", Content-Based Multimedia Information Access, RIAO, 2000.

Yan et al., "The Combination Limit in Multimedia Retrieval", ACM Multimedia, 2003.

Wu et al., "Optimal Multimodal Fusion for Multimedia data Analysis", 2004, ACM, New York, New York.

Vinokourov, et al., "Learning the Semantics of Multimedia Content with Application to Web Image Retrieval and Classification", in Proceedings of Fourth International Symposium on Independent Component Analysis and Blind Source Separation, 2003.

Fisher et al., "Learning Joint Statistical Models for Audio-Visual Fusion and Segregation", Advances in Neural Information Processing Systems 13, MIT Press, Cambridge MA, 2000.

Cascia, et al., "Combining Textual and Visual Cues for Content-Based Image Retrieval on the World Wide Web", IEEE Workshop on Content-based Access of Image and Video Libraries, 1998.

Velivelli et al., "Detection of Documentary Scene Changes by Audio-Visual Fusion", In proceedings of Iriternational conference on Image and video retrieval, 2003.

Beyer et al., "When is "Nearest Neighbor" Meaningful?", International Conference on Database Theory, pp. 217-235, 1999.

Donoho, "High-Dimensional Data Analysis: The Curses and Blessings of Dimensionality", American Math. Society Lecture—Match Challenges of the 21rst Century, 2000.

Goh et al., "SVM Binary Classifier Ensembles for Image Classification", ACM International Conference on Information and Knowledge Management (CIKM), 2001.

Kolenda, et al., "Independent Componenet Analysis for Understanding Multimedia Content", In Proc. of IEEE Workshop on Neural Networks for Signal Processing, 2002.

Adams et al., "IBM Research TREC-2002 Video Retrieval System" 2002, New York, New York.

Bartlett et al., "Independent Component Representation for Face Recognition", SPIE Conf. on Human Vision and Electronic Imaging III, 3299, pp. 528-539, 1998.

Bellman, R. (1961). Adaptive Control Processes. Princeton University Press.

Joliffe, I. (1986). Principle Component Analysis. Springer-Verlag.

* cited by examiner

MULTIMODAL HIGH-DIMENSIONAL DATA FUSION FOR CLASSIFICATION AND IDENTIFICATION

CROSS REFERENCE TO RELATED APPLICATION

This application claims benefit of earlier filed provisional patent application, U.S. application Ser. No. 60/571,036, filed on May 13, 2004, and entitled "Optimal Multimodal, High-Dimensional Data Fusion for Biometric Identification," which is hereby incorporated by reference as if fully set forth herein.

BACKGROUND OF THE INVENTION

1. Field of the Invention

The invention relates in general to classification of objects based upon information from multiple information sources and more particularly, to modal identification and classification fusion.

2. Description of the Related Art

Many real-world objects such as biometric and video may be represented by features from multiple modalities. For example, traditionally, videos are represented by features embedded in the tracks of visual, audio and caption text. Also, for example, biometric data may be collected from multiple sources including face, fingerprint, voice and DNA to identify a person. These features are extracted and then fused in a complementary way for understanding the semantics of a target object.

Unfortunately, there have been shortcomings with prior approaches to modality identification. A first approach to modality identification uses only one dimension, and does not require the fusion step. A second approach to modality identification treats each information source as one modality, and does require a fusion step.

The first approach to modality identification which uses only one dimension may suffer the "curse of dimensionality". Goh et al., Svm binary classifier ensembles for multiclass image classification, ACM International Conference on Information and Knowledge Management (CIKM), 2001, used the raw color and texture features to form a high-dimensional feature vector for each image. Recently, statistical methods such as Principal Component Analysis (PCA) and Independent Component Analysis (ICA) have been widely used in the Computer Vision, Machine Learning, Signal Processing communities to denoise data and to identify independent information sources. See M. L. Cascia, et al., Combining textual and visual cues for content-based image retrieval on the world wide web, IEEE Workshop on Content-based Access of Image and Video Libraries, 1998; L. Hansen, et al., On independent component analysis for multimedia signals, Multimedia Image and VideoProcessing, CRC Press, 2000; T. Kolenda, et al., Independent component analysis for understanding multimedia content, In Proc. of IEEE Workshop on Neural Networks for Signal Processing, 2002; A. Vinokourov, et al., Learning the semantics of multimedia content with application to web image retrieval and classification, In Proceedings of Fourth International Symposium on Independent Component Analysis and Blind Source Separation, 2003; and T. Westerveld, Image retrieval: Content versus context. Content-Based Multimedia Information Access, RIAO, 2000. In the multimedia community, it has been observed that audio and visual data of a video stream exhibit some statistical regularity, and that regularity can be explored for joint processing. See J. Hershey et al., Using audio-visual synchrony to locate sounds, Advances in Neural Information Processing Systems 12, MIT Press, Cambridge Mass., 2001; and F. J. W. III, et al., Learning joint statistical models for audio-visual fusion and segregation, Advances in Neural Information Processing Systems 13, MIT Press, Cambridge Mass., 2000. Smaragdis et al, Audio/visual independent components, International Symposium on Indepdendent Component Analysis and Blind Source Separation, 2003, proposed to operate on a fused set of audio/visual features and to look for combined subspace components amenable to interpretation. Vinokourov et al., Inferring a semantic representation of text via cross-language correlation analysis, In Advances of Neural Information Processing, 2002, found a common latent/semantic space from multi-language documents using independent component analysis for cross-language document retrieval. A shortcoming of these prior teachings is that the curse of dimensionality arises, causing ineffective feature-to-semantics mapping and inefficient indexing See Y. Rui, et al., Image retrieval: Past, present, and future, International Symposium on Multimedia Information Processing, 1997. This phenomenon has been termed the dimensionality curse because it can severely hamper the effectiveness of data analysis. See R. Bellman, Adaptive control processes, Princeton, 1961.

The second approach to modality identification, which treats each information source as one modality, may suffer from inaccuracies due to inter-dependencies between sources. This second approach treats the features as m modalities, with $d_i$ features in the $i^{th}$ modality ($i=1, \ldots, m$). Much work in image and video retrieval analysis employs this approach. For example, the QBIC system supported image queries based on combining distances from the color and texture modalities. See M. Flickner et al., Query by image and video content: the qbic system, 1997. Velivelli et al., Detection of documentary scene changes by audio-visual fusion, In proceedings of International conference on Image and video retrieval, 2003, separated video features into audio and visual modalities. Adams et al., Ibm research tree-2002 video retrieval system, also regarded each media track (visual, audio, textual, etc.) as one modality. For each modality, these works trained a separate classification model, and then used the weighted-sum rule to fuse a class-prediction decision. This modality-decomposition method can alleviate the "curse of dimensionality." However, since media sources are treated separately, the inter-dependencies between sources may be left unexplored.

There also have been shortcomings with fusion of classification data for different modalities. Given that D modalities have been obtained, there is a need to for D classifiers, one to interpret data for each modality. The challenge is to fuse the D classifiers to provide an overall classification. The fusion challenge is enhanced because D modalities typically are not entirely independent of each other. For example, PCA and ICA often cannot perfectly identify independent components for at least two reasons. First, well-known ICA algorithms (e.g., fixed-point algorithm, Infomax, kernel canonical analysis, and kernel independent analysis) generally require a good estimate of the number of independent components k to find them effectively. Second, ICA typically performs a best attempt under some error-minimization criteria to find k independent components. Nevertheless, the resulting components, as shown still may exhibit inter-dependencies.

Various fusion strategies for multimodal information have been presented including product combination, weighted-sum, voting, and min-max aggregation. Among them, product combination and weighted-sum appear to be the most popular fusion methods. Unfortunately, there are significant problems with each of these approaches to fusion.

The product-combination rule is an optimal fusion model from the Bayesian perspective, assuming that D modalities are independent of each other, and that posterior probability can be accurately estimated for each modality. Unfortunately, however, the D modalities likely will not be truly independent and, we posterior probability ordinarily cannot be estimated with high accuracy. The work of D. M. Tax et al., Combining multiple classifiers by averaging or by multiplying, Journal of the Pattern Recognition, 33, 2000, concluded that the product-combination rule works well only when the posterior probability of individual classifiers can be accurately estimated.

The weighted-sum strategy is more tolerant to noise because sum does not magnify noise as severely as product. Unfortunately, however, weighted-sum is a linear model, not equipped to explore the inter-dependencies between modalities. Recently, Yan and Hauptmann R., The combination limit in multimedia retrieval. ACM Multimedia, 2003, presented a theoretical framework for bounding the average precision of a linear combination function in video retrieval. The framework concluded that the linear combination functions have limitations, and suggested that non-linearity and cross-media relationships should be introduced to achieve better performance.

Thus, there has been a need for improvements to modality identification and for improvements in classification fusion. The present invention meets these needs.

SUMMARY OF THE INVENTION

In one aspect, the identity of an object is evaluated. Feature information representing the object, such as a person for example, is converted to a plurality of mathematically defined components. The components are grouped into multiple modalities. A first set of predictions of the identity of the object is produced based upon information in the multiple modalities. In one embodiment, a separate identity prediction is produced for each modality. A separate first prediction is associated with each separate modality, and each separate prediction is based upon only information provided by its associated modality. A second prediction of the identity of the object is produced based upon the set of first predictions.

In another aspect, accuracy of the first predictions is enhanced by grouping components into modalities in which correlation among modalities is minimized by minimizing correlation among components within different modalities.

In yet another aspect, components are grouped into modalities such that a number of component dimensions in individual modalities is below a threshold selected so as to avoid the curse of dimensionality. Multiple levels of classifiers are used to perform first and second predictions. A first level of classifiers performs the first predictions. A second level of classifiers performs the second prediction. None of the first or second level classifiers produces a prediction in the face of the curse of dimensionality.

In still another aspect of the invention, a non-linear multi-modal classifier that has been trained based upon past learning is used to classify objects based upon components that represent object feature information and that have been grouped into multiple modalities.

These and other features and advantages of the invention will be apparent from the following detailed description of embodiments thereof in conjunction with the drawings.

DETAILED DESCRIPTION OF THE PREFERRED EMBODIMENTS

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Feature Extraction

Figure 1:
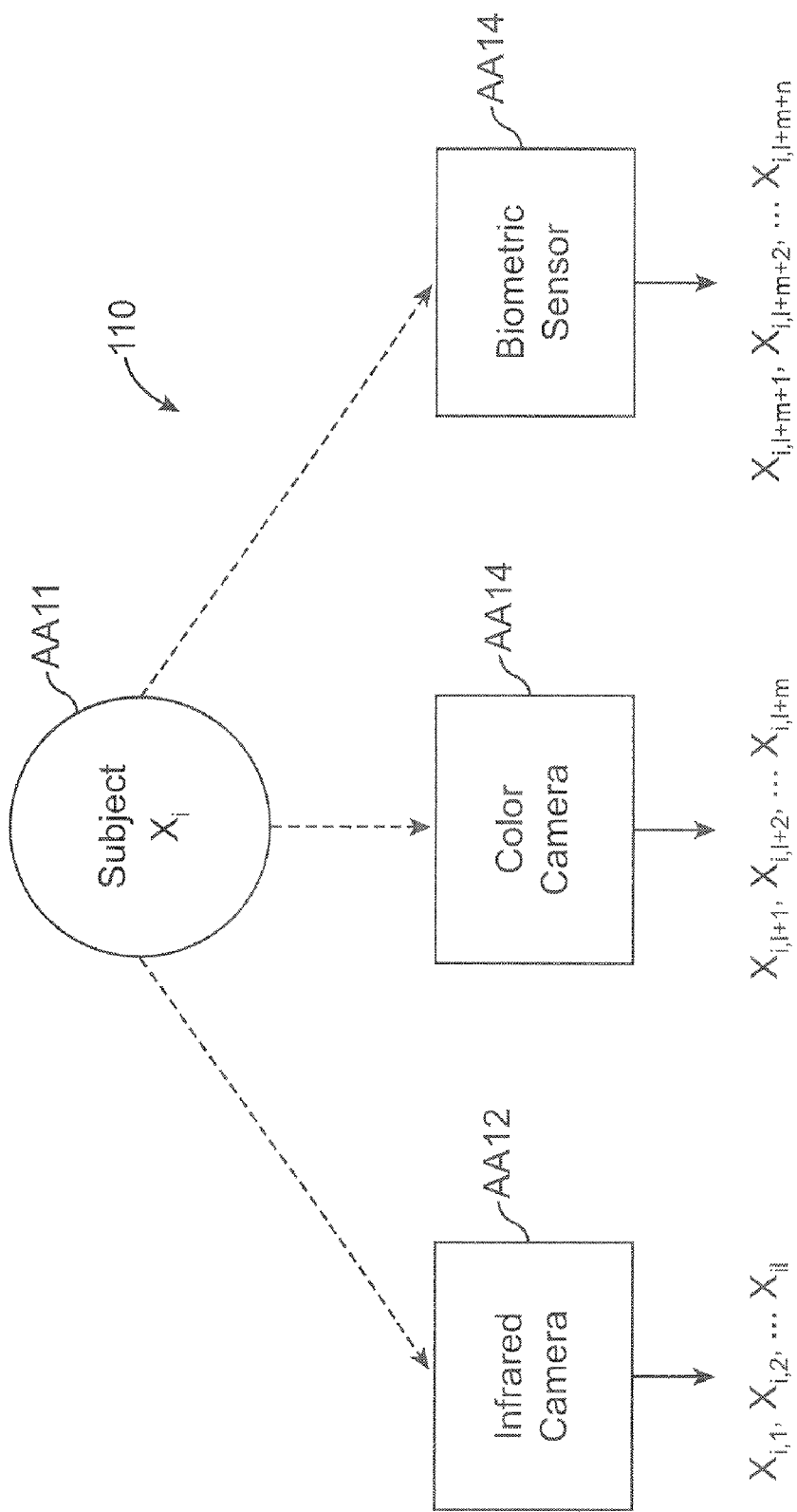
FIG. 1 is an illustrative drawing showing an information extraction subsystem including multiple information sources and showing features extracted from the physical world.

FIG. 1 is an illustrative drawing showing an information extraction subsystem 110 including multiple information sources and showing features extracted from the physical world. Each information source extracts different features of a subject 111 in the physical world. Features provide information about a subject to be classified or identified. In this example, a first information source includes an infrared camera 112. A second information source includes a color camera 114. A third information source includes a biometric sensor 116, such as a fingerprint sensor. There is a direct mapping between a physical world object and features extracted from the subject using the information extraction system 110.

The multiple information sources generates a feature vector for an object 111, such as a person, for instance. The infrared camera 112 can be used to generate l infrared feature elements based upon an infrared heat map of a person's face, for example. The color camera 114 can be used to generate m color camera feature elements based upon skin color and texture of the person's face, for example. The biometric sensor 116 can be used to generate n biometric feature elements based upon the person's fingerprint pattern, for example.

Thus, for a given subject $x_i$, in this example, a total of l+m+n feature elements can be generated by the information extraction system 112. The infrared camera 112 can produce features $x_{i,1}, X_{i,2} \ldots x_{i,l}$. The color camera 114 can produce features $x_{i,l+1}, x_{i,l+2} \ldots x_{i,l+m}$. The biometric sensor 116 can produce features $x_{i,l+m+1}, x_{i,l+m+2} \ldots x_{i,l+m+n}$.

Let R=l+m+n, the number of feature elements. In one embodiment of the invention, the R raw features are mapped into D modalities. Therefore, each of the D modalities comprises a mapping of the features to one or more components in a mathematically different space from the original physical feature space.

Training information is collected in a computer readable medium for a plurality of subjects N as follows. Features are extracted for each of N sample subjects. Each of the N sample subjects is labeled with a classification. For example, assuming that each sample subject corresponds to a different person, and that classification is by group membership, and that there are G group classifications ($L_1, \ldots L_G$), then each sample subject would be labeled to indicate his or her group membership classification. The number of training samples N, should be made large enough to adequately represent variability of the population of subjects.

The raw feature information is placed in an N×R matrix X:

| Sample Labels | Raw Feature Training Data | | |
|---|---|---|---|
| $L_{x1}$ | $X_{1,1}$ $X_{1,2}$ | $\cdots x_1, 1+m+n$ | |
| $L_{x2}$ | $X_{2,1}$ $X_2, Z$ | $\cdots x_2, 1+m+n$ | |
| . | . | . | |
| . | . | . | |
| . | . | . | |
| $L_{xN}$ | $X_{N,1}$ $X_{N,Z}$ | $\cdots x_N, 1+m+n$ | |

The raw feature matrix X is an information structure that may be stored in computer readable medium and contains R raw feature elements and a classification label for each of N subjects. Each row of the example feature matrix contains R feature elements extracted for one of the N subjects. Also, each sample subject, i.e. each row of features, is associated with a classification label indicating the classification of the sample subject associated with the features. The classification labels may be applied by a testing administrator, for example, who assigns classifications based upon observation of the sample subjects. The raw features in the feature matrix X correspond directly to the physical world. The classifications labels provide a direct correspondence between physical world features for a plurality of sample subjects and their classifications.

Features from different information sources may have a correlation between them, which could hinder training of classifiers, discussed below. For example, there may be a correlation between features extracted by the infrared camera 112 and features extracted by the color camera 114, due to similarities between facial color patterns and facial heat patterns. In general, training of a classifier will be more effective, and the classifier will be able to perform more accurate classifications, if there are fewer or weaker correlations among the training data, i.e. the features, extracted by different information sources.

Introduction to Mapping Features to Components

In accordance with one embodiment of the invention, raw data features are converted using a computer program controlled system to mathematically defined components. Actual training is performed using these components rather than the raw features. One reason to convert the raw data features into components is to remove noise from the features. Another reason to convert raw features into components is to reduce the effects of correlation among extracted features. In one embodiment, Principal Component Analysis (PCA) is used to reduce noise, and Independent Component Analysis (ICA) is used to reduce the effects of correlation.

Principal Component Analysis

PCA is a well known technique for removing noises and redundancies between feature dimensions. See, I. Joliffe, Principle Component Analysis, Springer-Verlag, New York, 1986. In essence, PCA is a dimension-reduction tool that can be used advantageously to reduce a large set of variables to a smaller set that still contains most of the information in the large set. PCA mathematically projects the original data to a lower dimensionality space such that the variance of the data is best maintained. It is well known from well known linear algebra that matrix X can be decomposed in the following form (known as singular value decomposition or SVD):

$$X = UDV^T,$$

where matrices $U_{R \times p}$ and $V_{N \times p}$ represent orthonormal basis vectors matrices (eigenvectors of the symmetric matrix $XX^T$ and $X^TX$), with p as the number of largest principal components. The $D_{p \times p}$ matrix is a diagonal matrix, and the diagonal elements of D are the eigenvalues of $XX^T$ and $X^TX$.

Thus, the D matrix and the U matrix are learned through PCA from the N training samples. The D matrix represents the principal components. The U matrix is used for mapping raw feature values into principal components in D.

More specifically, the mathematical formulation $U^TX$ can be stored as a structure in computer readable medium for use in converting raw features to principal components. The components defined by $U^TX$ provide the original raw feature data X as represented by the first p principal components obtained by the PCA procedure. For example, suppose X is 100-dimensional and p is 25. $U^TX$ is the result of mapping the 100-dimensional raw feature data to the 25-dimensional space formed by 25 orthogonal axes of the maximally spread out the data. In other words, $U^TX$ is the projection of X onto a subspace spanned by the p largest principal components (PC's)

Generally speaking in simplified conceptual terms, PCA identifies dimensions on which to map feature data so as to maximize what we shall call the 'spreadness' of the feature data. Each such dimension is a component. The feature data is mapped onto each component. The label information is maintained during the mapping for each sample. Each component has a mean point. Each component is selected so that the mapped feature data have maximum variance from the component's mean point. Also, each component is orthogonal to other components.

Figure 2:
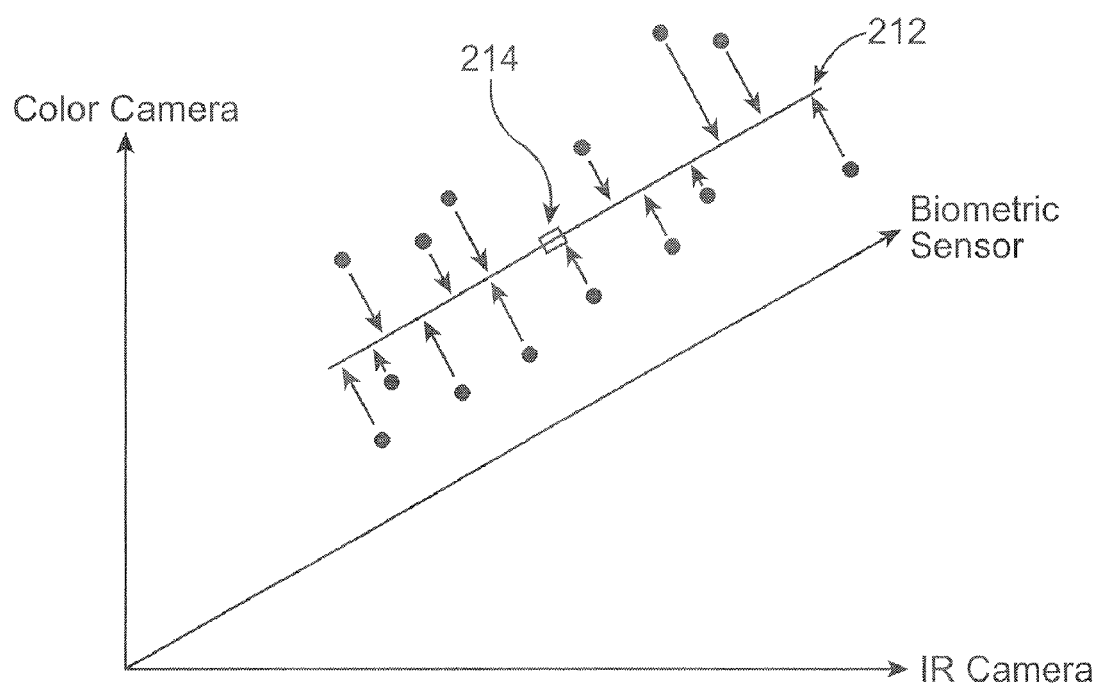
FIG. 2 is an illustrative drawing showing in general conceptual terms a mapping of feature data onto a principal component identified through PCA.

FIG. 2 is an illustrative drawing showing in general conceptual terms a computer program controlled mapping of feature data onto a principal component identified through PCA. Each data point shown in the drawing represents an R-long feature vector for an individual sample $x_i$. The label information remains associated with sample data throughout PCA process. Three axes correspond to the color camera 112, IR camera 114 and biometric sensor 116. Data points are mapped (indicated by arrows) onto a principal component 212, which has a mean location indicated as 214. The principal component 212 is selected so as to maximize variance of the feature data locations from the mean location 214. It will be appreciated that although only a single principal component (PC) is shown in FIG. 2, the raw feature data is similarly mapped to a plurality of other PCs, each of which is orthogonal to all of the other PCs identified through PCA.

Independent Component Analysis

Thus, PCA converts raw feature data into a plurality of components that serve to separate feature data along a plurality of orthogonal dimensions. PCA identifies k (i.e. multiple) principal components. Each is orthogonal to the others. In practice, there may be negative components, which represent noise. Negative components are thrown away. The number k represents the number of positive principal components that have been identified.

Compared to PCA, the spirit of ICA is to find statistically independent hidden sources from a given set of mixture signals. Both ICA and PCA project data matrices into components in mathematical spaces having dimensions might be different from physical space dimensions. However, the goals of the two methods are different. PCA finds components with maximum feature data variance. It maximizes spreadness of the feature data within the components. PCA is well suited for compressing data into a lower-dimensional space by removing least significant components. ICA seeks to find statistically independent components. ICA is well suited for separating mixed signals and finding the most representative components. In other words, ICA is used to achieve increased independence of components representing the feature data.

To formalize an ICA problem, assume that there are k unknown independent components $S=\{s_1, \ldots s_k\}$. Further assume a set of R samples $\{x_1, \ldots x_N\}$, which are mixture signals coming from k independent components $k \leq R$. We can represent all the observation data as a matrix $X_{R \times n}$. A linear mixture model can be formulated as:

$$X = AS$$

where $A_{R \times k}$ is a mixing matrix. The goal is to find $W = A^{-1}$; therefore given training set X, independent components (IC's) can be recovered through the transformation of $S = WX$.

ICA establishes a common latent space for the media, which can be viewed as a method for learning the inter-relations between the involved media. See P. Smaragdis and M. Casey, Audio/visual independent components, International Symposium on Independent Component Analysis and Blind Source Separation, pages 709–714, 2003. For multimedia data, observation data x.sub.i usually contains features coming from more than one medium. The different independent components {s.sub.l, . . . s.sub.k}provide a meaningful segmentation of the feature space. In one embodiment, the k.sup.th column of W.sup.−1 constitutes the original multiple features associated with the k.sup.th independent component. An advantage of ICA is that it provides unsupervised groupings of data that have been shown to be well aligned with manual grouping in different media. See L. Hansen, et al. On independent component analysis for multimedia signals, Multimedia Image and Video Processing, CRC Press, 2000. The representative and non-redundant feature representations form a solid base for later processing.

One embodiment of the present invention employs a PCA technique as preprocessing to ICA to reduce noise in the data and control the number of independent components. See M. S. Bartlett et al., Independent component representation for face recognition, SPIE Conf. on Human Vision and Electronic Imaging III, 3299: 528–539, 1998. Basically, ICA is performed on the main eigenvectors of PCA representations (k=p, where p is the number of PC's) to determine which PC's actually are independent and which should be grouped together as parts of a independent components. More specifically, independent component analysis (ICA) is performed on the PCA output $U^T X$, which may be stored in a computer readable medium to obtain estimates of independent feature components S and an estimate of a weighting matrix W, which also may be stored in computer readable medium, and that mixes the input $U^T X$ in such a way to produce S. The independent components are recovered by computing $S = W U^T X$.

Alternatively, ICA could be run without PCA preprocessing. For example, ICA could assume that the number of independent components is the same as the dimension of observed mixtures, that is, k=R.

As a result of ICA, the feature data are mapped onto k independent components. The independent components are different from the principal components. The label information is maintained during the mapping for samples to ICA components. Thus, there is a labeled entry in each ICA component for each subject sample in the training data set.

Overview of Grouping Components into Modalities

As explained above, components are selected such that each component represents the features differently from other components. In one embodiment, components are selected to maximize their independence from each other. The components are grouped into modalities such that each modality has a different set of components from the other modalities. In one embodiment, each component is grouped into only one modality, i.e., there is no duplication of components in different modalities. In one embodiment, components are selected to maximize their independence from each other. Thus, each modality represents features differently from other modalities.

As explained more fully below, modalities are groupings of components aimed primarily at avoiding the curse of dimensionality, which can affect processing accuracy. The mapping of features to components can lead to a representation of features by components that collectively have such a large number of dimensions that the curse of dimensionality becomes a problem. By grouping sets of one or more components into different modalities and separately processing each to classify or identify a subject, the curse can be avoided, since each modality is selected to have components with a total number of dimensions that is not large enough to suffer the curse.

It will be appreciated from the explanation that follows that in accordance with an embodiment of the invention, modalities, i.e. the groupings of components, are identified based upon interrelatedness of components into which features have been mapped. Specifically, modalities are selected so as to group together within common modalities those components that are the most interrelated and to separate into different modalities those components that are the most unrelated. This approach to modality grouping aims to optimize the usefulness of each modality in effecting a classification or identification prediction that is independent of predictions based upon other modalities.

Grouping Components Based Upon Independent Modality Analysis

It will be appreciated that, after PCA and ICA, the original variables have gone through a geometric transformation. The resulting k components are basically a new space that has a different set of axes (from a geometric perspective). Although ICA makes a best attempt to find independent components, the resulting k components might not be independent, and the number of components can be so large as to face the challenge of "dimensionality curse" during the statistical-analysis and query-processing phases. IMG aims to remedy these two problems by grouping k components into D modalities that are maximally independent of each other.

Thus, the k components are divided into D groups to satisfy two objectives. A first objective is to minimize the correlation between modalities A second objective is to ensure that the number of features in each modality is not so large as to suffer the dimensionality curse. The first objective seeks to maximize modality independence. The second objective seeks to avoid avoids the problem of curse-of-dimensionality.

A soft constraint is placed on the number of components that a modality can have. In one implementation of the invention, the threshold on the number of modalities is set so that the total number of dimensions in a modality does not exceed 30 because several prior works indicate that when the number of dimensions exceeds 20 to 30, the curse starts to kick in. See K. Beyer et al., When is "nearest neighbor" meaningful? International Conference on Database Theory, pages 217–235, 1999; D. L. Donobo, High-dimensional data analysis: The curse and blessing of dimensionality, American Math. Society Lecture—Match Challenges of the 21$^{st}$ Century, 2000; R. Fagin et al., Optimal aggregation algorithms for middleware, ACM Symposium on Principles of Database Systems, 2001. Since only the data itself can tell exactly at what dimension the curse starts to take effect, the selection of D should go through a cross-validation process; a small number of candidate D values should be selected and experiments should be performed to choose the best D.

For a given D, a clustering approach is employed approach to divide k components into D groups. Ding et al., A min-max cut algorithm for graph partitioning and data clustering, IEEE International Conference on Data Mining, pages 107–114, 2001 provide a theoretical analysis to show that minimizing inter-subgraph similarities and maximizing intra-subgraph similarities always lead to more balanced graph partitions. Thus, minimizing inter-group feature correlation and maximizing intra-group feature correlation is used as the feature-grouping criteria to determine D independent modalities, $M_1, \ldots, M_D$. Each of the M modalities can include a different number of the k components. However a component can be in only one of the D groups.

Correlation between features within the same media source and across different media sources is measured by computing the covariance matrix:

$$C = \frac{1}{N} \sum_{x_i \in X} (x_i - \bar{x})(x_i - \bar{x})^T \text{ with } \bar{x} = \frac{1}{N} \sum_{x_i \in X} x_i \quad (1)$$

where N is the total number of sample data, $x_i$ is a feature vector to represent $i^{th}$ sample, and X is the set of feature vectors for N samples. Normalized correlation between features i and j is defined by $$\hat{C}(i, j) = \frac{C(i, j)}{\sqrt{C(i, i) \times C(j, j)}}. \quad (2)$$

The inter-group feature correlation between two modalities $M_i$ and $M_j$ is defined as $$C(M_i, M_j) = \sum_{\forall S_i \in M_i, \forall S_j \in M_j} C(S_i, S_j) \quad (3)$$

where $S_i$ and $S_j$ are components belonging to modalities $M_i$ and $M_j$ respectively, and $C(S_i, S_j)$ is the normalized feature correlation between $S_i$ and $S_j$. $C(S_i, S_j)$ can be calculated using Equation 1 and Equation 2.

Equation 1 shows how correlation between two components can be computed. Equation 2 shows the normalized correlation between components i and j. So, Equation 2 depends on Equation 1. Once the normalized correlations have been obtained, they can be used in Equation 3. For instance, assume four components $S_1, S_2, S_3,$ and $S_4$, divided into two groups. $S_1$ and $S_2$ belong to $M_1$, and $S_3$, and $S_4$ belong to $M_2$. C ($M_1, M_2$) is then equal to the sum of the cross-group component-level correlations. In this case C ($M_1, M_2$)=C ($S_1, S_3$)+C (S1, $S_4$)+C ($S_2, S_3$)+C ($S_2, S_4$).

The intra-group feature correlation within modality $M_i$ is defined as $$C(M_i) = C(M_i, M_i). \quad (4)$$

The following objective function can be used to group all the features into D modalities while minimizing inter-group feature correlation and while maximizing intra-group feature correlation, $$\min \sum_{\substack{i=1 \\ j>i}}^{D} \left[ \frac{C(M_i, M_j)}{C(M_i)} + \frac{C(M_i, M_j)}{C(M_j)} \right]. \quad (5)$$

Solving this objective function yields D modalities, with minimal inter-modality correlation and balanced features in each modality. It will be appreciated that although this objective function can be computationally expensive to compute, such computation is performed during pre-processing process only once, so it is generally acceptable.

Also, it will be understood that label information remains associated with sample subject feature information that has been mapped onto components that have been separated into groups.

Figure 3:
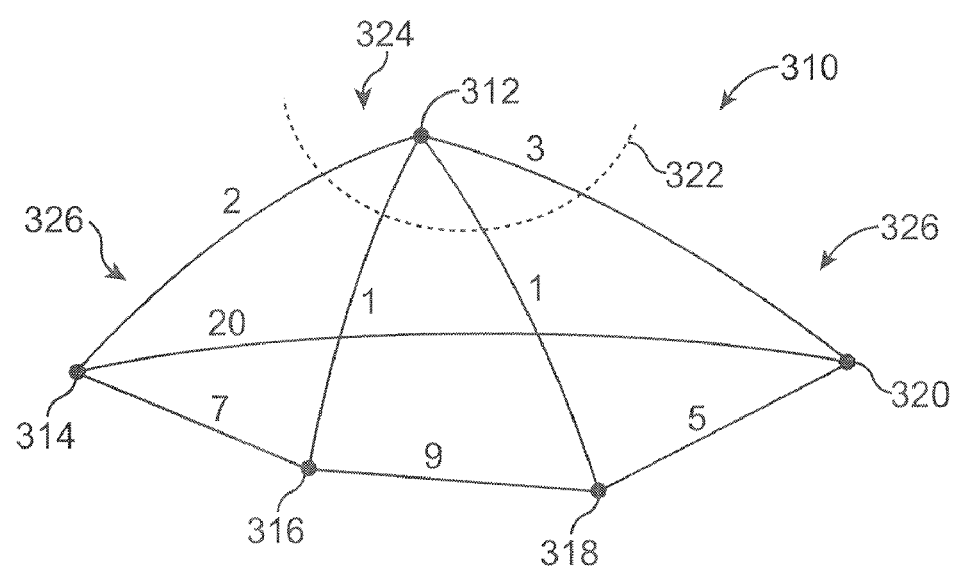
FIG. 3 is a generalized simplified drawing illustrating in conceptual terms a graph cutting approach to identification of D independent groups using IMG in accordance with an embodiment of the invention.

FIG. 3 is a generalized simplified drawing illustrating in conceptual terms a graph cutting approach to identification of D independent groups using IMG in accordance with an embodiment of the invention. A graph 310 includes vertices 312–320. Each vertex corresponds to a component in ICA. The vertices are interconnected by edges labeled with weights indicative of the correlation between vertices they interconnect. A higher weight value indicates stronger correlation. For example, the weight associated with the edge between vertices 312 and 316 is one (1); the weight associated with the edge between vertices 314 and 316 is seven (7); and the weight between vertices 314 and 320 is twenty (20). Thus, components 314 and 316 are more highly correlated than are components 312 and 316, and components 314 and 320 are more highly correlated than are components 314 and 316. A goal of IMG is to separate components into groups in which components have weaker correlations with other components outside their group than they do with components within their group. The dashed line 322 represents a cut line that cuts graph 310 into two sub-graphs 324 and 326 to achieve this goal. The cut line cuts through the edges associated with lower correlation weights so as to separate component 312 into sub-graph 324 and to separates components 314–320 into sub-graph 326.

Once D modalities have been identified through independent modality analysis, the multimodal feature information is can be used to make predictions.

Predicting Using Eager Learning

Predictions may follow an "eager learning" approach that employs classifiers based upon past learning to derive classification predictions from multimodal feature information. Each modality contains separate information useful to classification or identification. An eager learning embodiment includes multiple levels of classifiers. A first level of classifiers performs classification predictions based upon feature information provided in individual modalities. A second level classifier performs classification predictions based upon classification predictions produced by the first level of classifiers. The goal is to use classifiers trained to extract useful classification or identification predictors from the information in each of the D modalities and to combine or fuse that information into an overall classification or identification predictor.

As used herein, a classifier is a function module that has been trained to determine output classification prediction information based upon a prescribed set of input information. A plurality of first level of classifiers $f_1 \ldots f_D$ produce respective classification predictions based upon information input from their respective associated modalities $M_1 \ldots M_D$. For instance, classifier $f_1$ produces a classification prediction based upon components of $M_1$. A second level classifier f produces a classification prediction based upon the multiple of classification predictions of $f_1 \ldots f_D$. The classifiers may be implemented as computer program code modules encoded in computer readable medium, for example.

Figure 4:
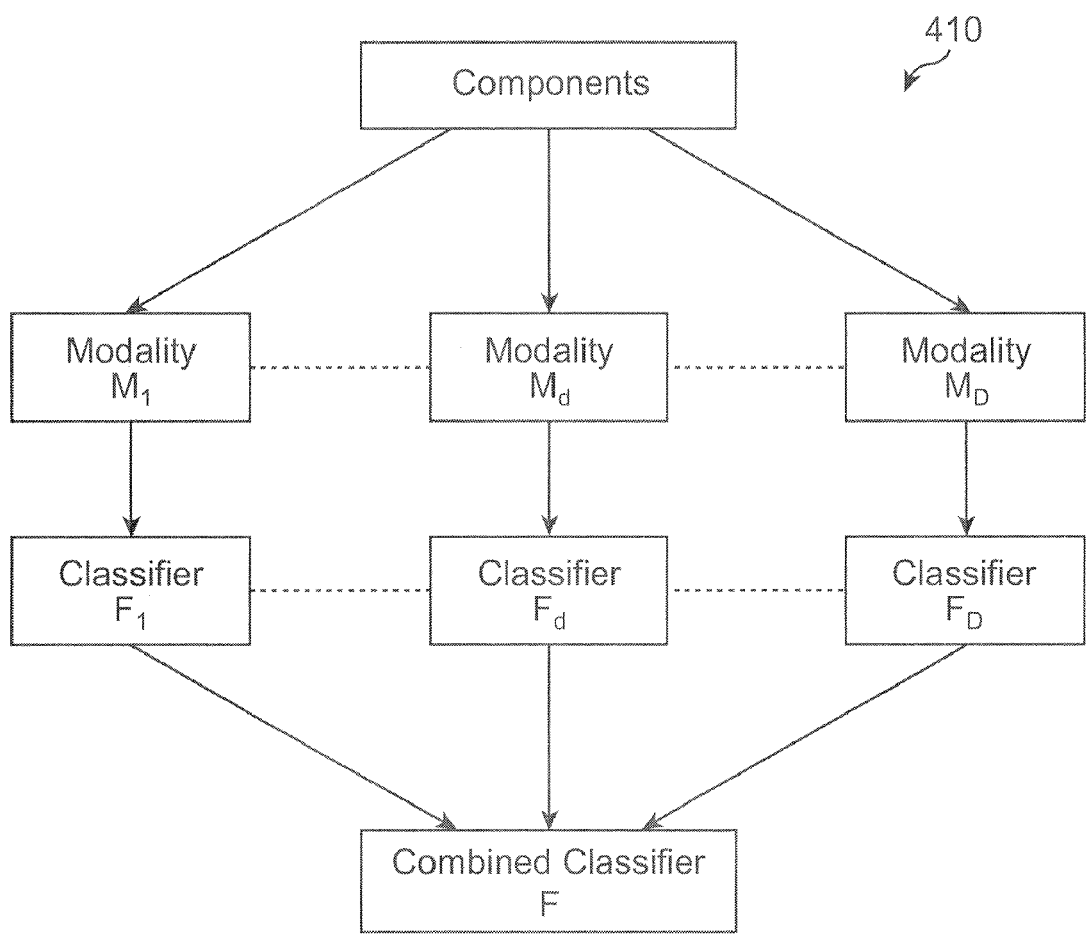
FIG. 4 is an illustrative drawing of system that implements a classifier fusion to predict based upon multimodal input in accordance with an embodiment of the invention.

FIG. 4 is an illustrative drawing of system that implements a classifier fusion architecture 410 in accordance with an embodiment of the invention. Raw features are mapped into a set of D modalities $M_1 \ldots M_D$. Each modality is associated with a corresponding modality classifier $f_1 \ldots f_D$. The classifiers provide individual classification predictions to a combined classifier f, which produces an overall classification prediction. Each modality includes a group of components. More specifically, in one embodiment, the raw features are mapped into multiple dimensions in a mathematically defined space that is different from physical feature space. In one embodiment, the mapping involves PCA and ICA. Each modality classifier that performs a classification prediction using the information from its associated modality. Feature information of $M_1$ is provided to modality classifier $f_1$ which produces a first classification prediction based upon the $M_1$ information. Feature information of $M_2$ is provided to modality classifier $f_2$ (not shown) which produces a first classification prediction based upon the $M_2$ (not shown) information, etc. The classification predictions of each of the multiple classifiers $f_1 \ldots f_D$ is provided to a combined classifier f, which fuses the individual classifications into an overall classification prediction.

In one embodiment, before actual classification predictions are made, the modality classifiers $f_1 \ldots f_D$, and the combined classifier f are trained based upon mapped feature data. Specifically, classifier $f_1$ is trained using feature data mapped into components of $M_1$. classifier $f_2$ is trained based upon feature data mapped into components of $M_2$, etc. After modality classifiers $f_1 \ldots f_D$ have been trained, classifier f is trained based upon classification predictions by the multiple modality classifiers $f_1 \ldots f_D$ based upon the mapped feature data.

Individual modality classifiers are trained. The inputs to a modality classifier process include the n training instances $\{x_1, \ldots, x_n\}$ and their corresponding labels $\{y_1, \ldots, y_n\}$. After the independent modality analysis (IMA), the R-dimensional features are mapped into the D modalities. Each training instance $x_t$ is represented by $\{x_t^1, \ldots, x_t^D\}$, where $x_t^d$ is the feature representation for $x_t$ in dth modality. All the training instances are divided into D matrices $\{M_1, \ldots, M_D\}$, where each $M_d$ is an N×|$M_d$| matrix, and |$M_d$|is the number of features in $d^{th}$ modality (d=1 ... D). To train each classifier $f_d$, a learning algorithm is employed, such as support vector machine (SVM) as the base-classifier. That is, given $M_d$, SVMs are applied on the training data to learn a function $f_d$. For training each $f_d$, the kernel function and kernel parameters are carefully chosen via cross validation. In one embodiment, cross-validation is almost equivalent to trial-and-error. Several different Kernel parameter settings, such as the width of a Gaussian or Laplacian function, are tried to determine which setting could give the best prediction accuracy on some hold-out data. The setting that gives the best result is the choice.

The modality classifiers $f_1 \ldots f_D$ are used in the training of the combined classifier f, which serves as a super-predictor that produces an overall prediction based upon the combined predictions of the multiple modality classifiers. For instance, each modality classifier may employ a unique equation learned through training produce a scalar value representing a label prediction for the feature information of its corresponding modality. The scalar values produced by the modality classifiers are used in training the combined classifier.

A classifier outputs a prediction with a confidence score. The confidence score is an estimate of posterior probability. Therefore, the posterior probability is to be estimated. More specifically, once the D modality classifiers have been trained, a super-kernel matrix K is produced for use in modality fusion. This matrix is created by passing each training instance to each of the D modality classifiers to estimate its posterior probability. Platt's formula is used to convert an SVM score to probability. See J. Platt, Probabilistic outputs for support vector machines and comparison to regularized likelihood methods, Advances in Large Margin Classifiers, MIT Press, pages 61–74, 2000, which is expressly incorporated herein by this reference. As a result of this step, an N.times.D matrix is obtained consisting of N entries of D class-prediction probability.

The combined classifier f is trained. Training involves a super-kernel matrix K, of D-element vectors for each of the N raw feature data training instances. More particularly, N is the number of raw feature data training samples, and D is the number of modality groups. Each of the N samples is represented in the matrix K by a respective D classifier values, one each from each of the modality classifiers $f_1 \ldots f_D$. Moreover, each set of D modality classifiers in matrix K corresponds to the original label applied to the raw feature data from which the D classifier values are derived.

SVMs are applied to train the super-classifier f. The inputs to SVMs include K, training labels, a selected kernel function, and kernel parameters. Basically, the super-kernel matrix K is treated like any similarity matrix that contains pair-wise similarity between data instances. In one embodiment, a kernel function is selected that can compute pairwise similarity between D-modality vectors. One suitable kernel function computes two vectors Euclidean distance. Please replace Euclidean distance with Gaussian kernel function). The complexity of the fusion model depends on the kernel function that is chosen. For instance, we can select a polynomial, radial-based function (RBF) or Laplacian function. These three functions are well-known kernel functions used to compute pairwise similarity between two instances.

The training process results in a combined classifier that can fuse the results of the $f_1 \ldots f_D$ to provide an overall class prediction for a new arbitrary query subject $x_q$. Assume query instance $x_q$ is an R-dimensional feature vector in original feature space. Query instance $x_q$ can be converted it to an ICA feature representation $WU^T x_q$, where W and U are transformation matrices obtained from PCA and ICA process, respectively. Then $WU^T x_q$ is further divided into D modalities (information obtained from the IMG process), identified as $\{x_q^1, \ldots, x_q^D\}$. The class-prediction function for query point $x_q$ uses the modality classifiers $f_1 \ldots f_D$ and the combined classifier f and can be expressed as:

$$\hat{y}_q = f(f_1(x_q^1), \ldots, f_d(x_q^D)).$$

Alternatively, rather than use a combined classifier, a product combination rule could be employed to combine modality classifier predictions into an overall prediction. The product-combination rule can be formulated as, $$f = \prod_{d=1}^{D} f_d.$$

And perhaps the most widely used weighted-sum rule can be depicted as, $$f = \prod_{d=1}^{D} \mu_d f_d,$$

where $\mu_d$ is the weight for individual classifier $f_d$. While each of these alternative "eager learning" approaches, can produce a classification prediction based upon multiple modality classifier predictions, the product combination approach is especially susceptible to error due to noise in the individual modality classifier results. If any of the individual classifiers is significantly inaccurate, then the inaccuracy will show up directly in the product representing the classification. Also, the sum rule may suffer inaccuracies due to its linear combination approach, since the modalities may not necessarily be independent, despite efforts to achieve independence, such as ICA. In contrast, the super-classifier f, is non-linear in operation and reduces the effects of dependencies among components of different modalities, and therefore, produces more accurate classification predictions.

Predicting Using Lazy Learning

Alternatively, predictions may follow a "lazy learning" approach that employs similarity searching. This approach is termed lazy because it generally does not involve learning. For example, for a query instance $x_q$ raw feature data is mapped to components in multiple modalities. In one embodiment, PCA, ICA and IMG are used to achieve such mapping. However, rather than use classifiers, that modality data is used to perform similarity searches in one or more databases for instances of previously stored modality data that matches or closely approximates the query modality data. Similarity search results are retrieved for each modality. The results then are subject to a voting process to select the previously stored instances that are predicted to represent to the query. More specifically, assume a query instance $x_q$ has raw feature data $\{x_{q1} \ldots x_{q, 1+m+n}\}$. Query instance $x_q$ can be converted to an ICA feature representation $WU^T x_q$, where W and U are transformation matrices obtained from PCA and ICA process, respectively. Then $WU^T x_q$ can be further divided into D modalities (information obtained from the IMG process), identified as $M_1 \ldots M_D$.

Figure 5:
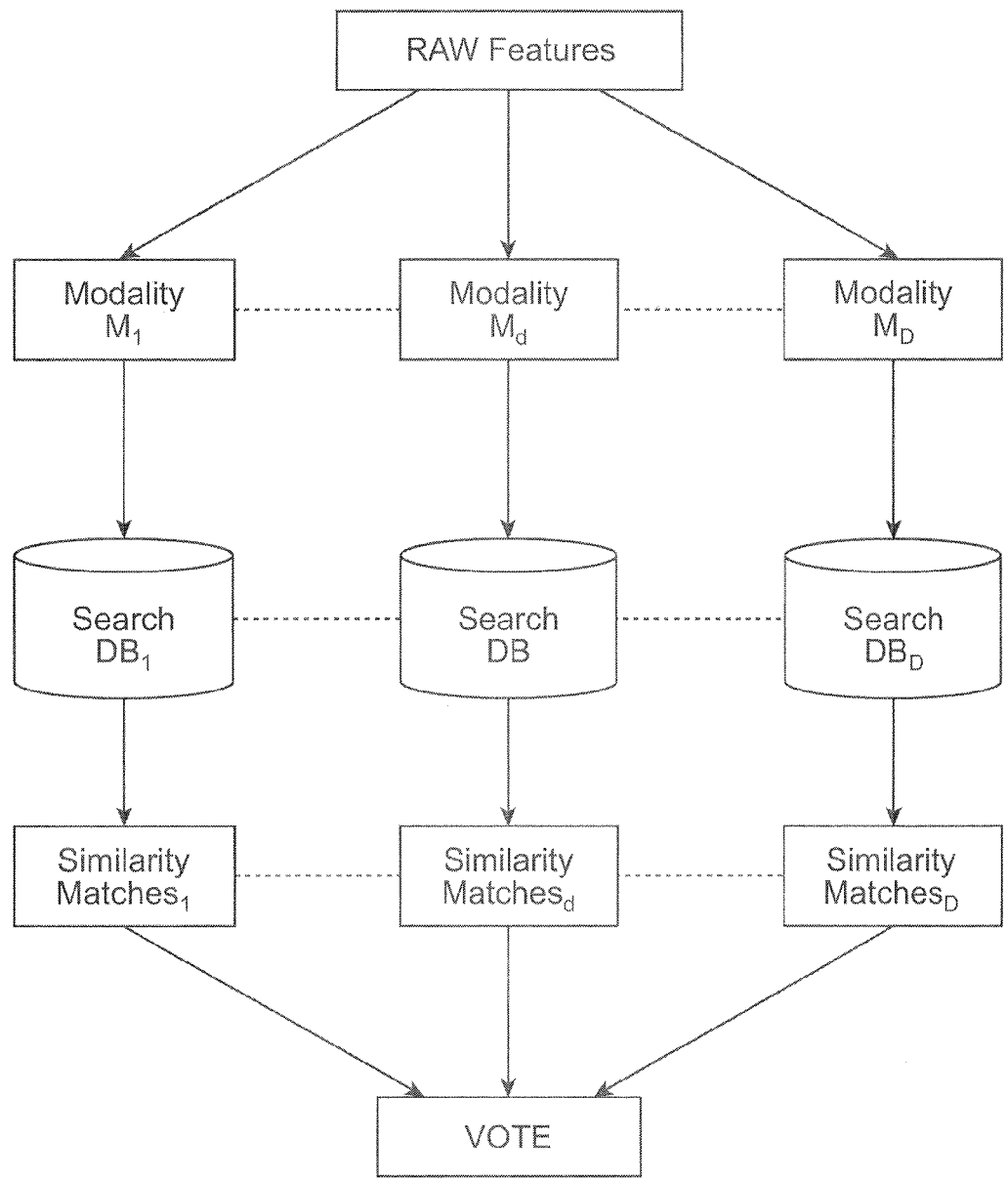
FIG. 5 is an illustrative drawing of a system that implements similarity searching to predict based upon multimodal input in accordance with an embodiment of the invention.

FIG. 5 is an illustrative drawing of a system 510 that uses similarity searching to predict based upon multimodal input. Raw features are mapped into a set of D modalities $M_1 \ldots M_D$. Each modality is associated with a corresponding databases ($DB_1 \ldots DB_D$). The databases include previously stored modality information for individual subjects. For example, $DB_1$ contains previously stored M1 modality information for a multiplicity of subjects. $M_d$ contains previously stored M1 modality information for the same multiplicity of subjects. It will be understood that, although the databases are shown as being separated, they may be implemented as one database that permits separate access to previously stored information for different modalities. A similarity search matches output is provided for each database. Again, it will be appreciated that, there may be a single output that is accessed by the multiple databases. A voting component receives the similarity match outputs provided by the databases $DB_1 \ldots DB_D$ and performs a voting function to make a prediction For example, a search query $x_q$ may be represented. The search query involves an R-dimensional feature vector that is mapped into multiple modalities $M_1 \ldots M_D$ so as to produce D modality vectors, one corresponding to each of $M_1 \ldots M_D$. These D modality vectors serve as bases for corresponding searches of $DB_1 \ldots DB_D$ for previously stored modality vectors bearing similarity to $x_q$'s D modality vectors. Perhaps the top ten (10) most similar previously stored modality vectors will be returned as similarity matches for associated the modalities $M_1 \ldots M_D$. These returned similarity search results are subjected to the voting process to determine a predicted identity of the query instance $x_q$. It will be appreciated that the voting process may involve a weighting of the similarity search results for the different modalities based upon the confidence level in search results, for example.

Figure 6:
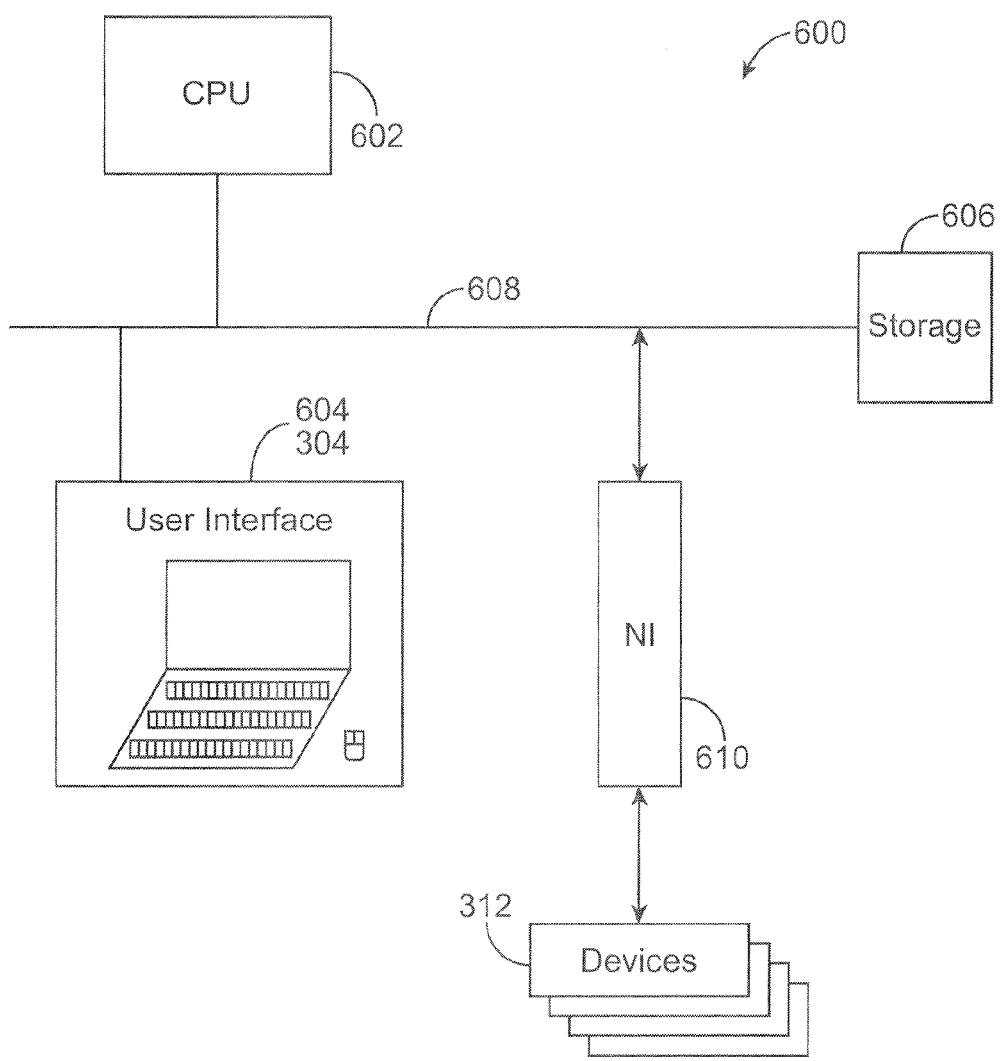
FIG. 6 is a schematic drawing of an illustrative computer system that can be programmed to serve as a classification or identification system in accordance with an embodiment of the invention.

FIG. 6 is a schematic drawing of an illustrative computer system 610 that can be programmed to serve as a classification or identification system in accordance with an embodiment of the invention. The computer system 610 includes one or more central processing units (CPU's) 612, a user interface 614, computer readable storage media 616, a system bus 618, and one or more bus interfaces for connecting the CPU, user interface, memory and system bus together. The computer system also includes a network interface 620 for communicating with other devices 622 on a computer network.

Information structures $U^TX$, weighting matrix W, may be provided, via bus 618, from interface 614, storage 616 or other devices 622, so as to be available from storage 616 to compute independent components $S=WU^TX$ using CPU 612. Similarly, first classifiers $f_1 \ldots f_D$ and second classifier f similarly may be provided, via bus 618, from interface 614, storage 616 or other devices 622, so as to be available from storage 616 to compute predictions using CPU 612.

While the invention has been described herein with reference to various illustrative features, aspects and embodiments, it will be appreciated that the invention is susceptible of variations, modifications and other embodiments, other than those specifically shown and described. The invention is therefore to be broadly interpreted and construed as including all such alternative variations, modifications and other embodiments within its spirit and scope as hereinafter claimed.

What is claimed is:

1. A method of evaluating identity of an object comprising:
   converting feature information representing the object to a plurality of mathematically defined components;
   grouping the components into multiple modalities based upon measured correlation among components with each other;
   wherein grouping the components involves grouping together within common modalities those components that have higher correlation with each other;
   producing respective first prediction information for each respective modality wherein the respective prediction information for each respective modality is based upon respective components grouped into that respective modality; and
   producing second prediction information based upon the respective first prediction information produced for the multiple respective modalities.

2. The method of claim 1,
   wherein converting involves mapping the feature information to components in a mathematically different space from the original feature space.

3. The method of claim 1,
   wherein converting involves independent component analysis.

4. The method of claim 1,
   wherein converting involves principal component analysis.

5. The method of claim 1,
   wherein converting involves independent component analysis; and
   wherein converting involves principal component analysis.

6. The method of claim 1,
   wherein grouping the components involves ensuring that total dimensions within individual modalities is below a prescribed threshold based upon the curse of dimensionality.

7. The method of claim 1,
   measuring correlation among the components from each other.

8. The method of claim 1,
   wherein grouping the components involves separating into different modalities those components that have lower correlation with each other.

9. The method of claim 1,
   measuring correlation among the components; and
   wherein grouping the components involves separating into different modalities those components that have lower correlation each other.

10. The method of claim 1,
    measuring correlation among the components; and
    wherein grouping the components involves ensuring that total dimensions within individual modalities is below a prescribed threshold based upon the curse of dimensionality.

11. The method of claim 1,
    wherein grouping involves grouping the components into multiple modalities so as to minimize correlation among modalities and so as to limit dimensions within individual modalities to below a prescribed threshold based upon the curse of dimensionality.

12. The method of claim 1,
    wherein producing respective first prediction information involves producing respective first classification prediction information for each respective modality.

13. The method of claim 1,
    wherein producing respective first prediction information involves producing respective first classification prediction information for each respective modality; and
    wherein producing second prediction information involves producing second classification prediction information based upon the respective first classification prediction information.

14. The method of claim 1,
    wherein producing respective first prediction information involves respectively mapping feature information to respective new modality vectors for each respective modality; further including,
    locating in at least one database respective previously stored modality vectors that are similar to the respective new modality vectors; and
    wherein producing second prediction information includes predicting identification of the object based upon the located previously stored modality vectors.

15. The method of claim 1,
    wherein producing respective first prediction information involves respectively mapping feature information to respective new modality vectors for each respective modality; further including,
    locating in at least one database respective previously stored modality vectors that are similar to the respective new modality vectors; and
    wherein producing second prediction information includes voting among located previously stored modality vectors to predict identification of the object.

16. The method of claim 1 further including:
    receiving information concerning the object from multiple information sources; and extracting feature information about the object from the received information.

17. A method of evaluating identity of an object comprising:
    converting the feature information to a plurality of mathematically defined components;

grouping the components into multiple modalities based upon measured correlation among components with each other;

wherein grouping the components involves grouping together within common modalities those components that have higher correlation with each other so as to minimize correlation among modalities and so as to limit dimensions within individual modalities to below a prescribed threshold based upon the curse of dimensionality;

producing respective first classification prediction information for each respective modality wherein the respective first classification prediction information for each respective modality is based upon respective components grouped into that respective modality;

producing second classification prediction information based upon a non-linear combination of the respective first classification prediction information produced for the multiple respective modalities.

18. A method of evaluating identity of an object comprising:

converting the feature information to a plurality of mathematically defined components;

grouping the components into multiple modalities based upon measured correlation with each other;

wherein grouping the components involves grouping together within common modalities those components that have higher correlation with each other so as to minimize correlation among modalities and so as to limit dimensions within individual modalities to below a prescribed threshold based upon the curse of dimensionality;

producing respective first prediction information by respectively mapping feature information to respective new modality vectors for each respective modality;

locating in at least one database respective previously stored modality vectors that are similar to the respective new modality vectors; and producing second prediction information based upon the located previously stored modality vectors.

19. The method of claim 18, wherein producing second prediction information includes voting among located previously stored modality vectors to predict identification of the object.

20. A system for evaluating identity of an object comprising:

means for convening feature information representing the object to a plurality of mathematically defined components;

means for grouping the components into multiple modalities based upon measured correlation of the components with each other;

wherein the means for grouping groups together within common modalities those components that have higher correlation with each other;

multiple first classifiers, each associated with modality, each producing respective first classification prediction information for each respective modality, based upon respective components grouped into that respective modality; and a second classifier producing second classification prediction information based upon a non-linear combination of the respective first classification prediction information produced for the multiple respective modalities.

21. The system of claim 20, wherein the means for grouping groups the components into multiple modalities so as to minimize correlation among modalities and so as to limit dimensions within individual modalities to below a prescribed threshold based upon the curse of dimensionality.

22. A system for evaluating identity of an object comprising:

means for converting feature information representing the object to a plurality of mathematically defined components;

means for grouping the components into multiple modalities based upon measured correlation among components with each other;

wherein the means for grouping groups together within common modalities those components that have higher correlation with each other;

multiple means for respectively mapping feature information to respective new modality vectors for each respective modality;

means for locating in at least one database respective previously stored modality vectors that are similar to the respective new modality vectors; and means for producing prediction information based upon the located previously stored modality vectors.

23. The system of claim 22, wherein the means for grouping groups the components into multiple modalities so as to minimize correlation among modalities and so as to limit dimensions within individual modalities to below a prescribed threshold based upon the curse of dimensionality.

24. The system of claim 22, wherein the means for producing prediction information uses voting among the located previously stored modality vectors to produce the second prediction information.

25. Computer readable medium having executable instructions for performing a method comprising:

converting feature information representing an object to a plurality of mathematically defined components;

grouping the components into multiple modalities based upon measured correlation among components with each other;

wherein grouping the components involves grouping together within common modalities those components that have higher correlation with each other;

producing respective first prediction information for each respective modality wherein the respective prediction information for each respective modality is based upon respective components grouped into that respective modality; and producing second prediction information based upon the respective first prediction information produced for the multiple respective modalities.

26. The computer readable medium of claim 25, wherein converting involves mapping the feature information to components in a mathematically different space from the original feature space.

27. The computer readable medium of claim 25, wherein converting involves independent component analysis.

28. The computer readable medium of claim 25, wherein converting involves principal component analysis.

29. The computer readable medium of claim 25, wherein convening involves independent component analysis; and wherein convening involves principal component analysis.

30. The computer readable medium of claim 25,
wherein grouping the components involves ensuring that total dimensions within individual modalities is below a prescribed threshold based upon the curse of dimensionality.

31. The computer readable medium of claim 25,
wherein grouping involves grouping the components into multiple modalities so as to minimize correlation among modalities and so as to limit dimensions within individual modalities to below a prescribed threshold based upon the curse of dimensionality.

32. The computer readable medium of claim 25,
wherein producing respective first prediction information involves producing respective first classification prediction information for each respective modality; and
wherein producing second prediction information involves producing second classification prediction information based upon a non-linear combination of the respective first classification prediction information.

33. The computer readable medium of claim 25,
wherein producing respective first prediction information involves respectively mapping feature information to respective new modality vectors for each respective modality; further including,
locating in at least one database respective previously stored modality vectors that are similar to the respective new modality vectors; and
wherein producing second prediction information includes voting among located previously stored modality vectors to predict identification of the object.

34. Computer readable medium having executable instructions for performing a method comprising:
converting the feature information representing an object to a plurality of mathematically defined components;
grouping the components into multiple modalities based upon measured correlation among components with each other, so that components that have higher correlation with each other are grouped together within common modalities so as to minimize correlation among modalities;
producing respective first classification prediction information for each respective modality wherein the respective first classification prediction information for each respective modality is based upon respective components grouped into that respective modality;
producing second classification prediction information based upon a non-linear combination of respective first classification prediction information produced for the multiple respective modalities.

35. Computer readable medium having executable instructions for performing a method comprising:
converting the feature information representing an object to a plurality of mathematically defined components;
grouping the components into multiple modalities based upon measured correlation among components with each other, so that components that have higher correlation with each other are grouped together within common modalities so as to limit dimensions within individual modalities to below a prescribed threshold based upon the curse of dimensionality;
producing respective first classification prediction information for each respective modality wherein the respective first classification prediction information for each respective modality is based upon respective components grouped into that respective modality;
producing second classification prediction information based upon a non-linear combination of the respective first classification prediction information produced for the multiple respective modalities.

36. Computer readable medium having executable instructions for performing a method comprising:
converting the feature information representing an object to a plurality of mathematically defined components;
grouping the components into multiple modalities based upon measured correlation among components with each other, so that components that have higher correlation with each other are grouped together within common modalities so as to minimize correlation among modalities;
producing respective first prediction information by respectively mapping feature information to respective new modality vectors for each respective modality;
locating in at least one database respective previously stored modality vectors that are similar to the respective new modality vectors; and
producing second prediction information based upon the located previously stored modality vectors.

37. Computer readable medium having executable instructions for performing a method comprising:
converting the feature information representing an object to a plurality of mathematically defined components;
grouping the components into multiple modalities based upon measured correlation among components with each other, so that components that have higher correlation with each other are grouped together within common modalities so as to limit dimensions within individual modalities to below a prescribed threshold based upon the curse of dimensionality;
producing respective first prediction information by respectively mapping feature information to respective new modality vectors for each respective modality;
locating in at least one database respective previously stored modality vectors that are similar to the respective new modality vectors; and
producing second prediction information based upon the located previously stored modality vectors.

38. A method of evaluating identity of an object comprising:
converting feature information representing the object to a plurality of mathematically defined components;
grouping the components into multiple modalities based upon measured correlation among components with each other;
wherein grouping the components involves separating into different modalities those components that have lower correlation with each other;
producing respective first prediction information for each respective modality wherein the respective prediction information for each respective modality is based upon respective components grouped into that respective modality; and
producing second prediction information based upon the respective first prediction information produced for the multiple respective modalities.

* * * * *